United States Patent
Biswas

(10) Patent No.: US 9,805,329 B1
(45) Date of Patent: Oct. 31, 2017

(54) REUSABLE SHIPPING PRODUCT

(75) Inventor: Michael J. Biswas, Culver City, CA (US)

(73) Assignee: Stamps.com Inc., El Segundo, CA (US)

( * ) Notice: Subject to any disclaimer, the term of this patent is extended or adjusted under 35 U.S.C. 154(b) by 1028 days.

(21) Appl. No.: 13/357,363

(22) Filed: Jan. 24, 2012

(51) Int. Cl.
 *G06Q 30/00* (2012.01)
 *G06Q 10/08* (2012.01)
(52) U.S. Cl.
 CPC .................................. *G06Q 10/083* (2013.01)
(58) Field of Classification Search
 CPC ... G06Q 10/0833; G06Q 10/083; G06Q 10/08
 USPC .................. 229/303; 705/330, 333
 See application file for complete search history.

(56) References Cited

U.S. PATENT DOCUMENTS

| | | | |
|---|---|---|---|
| 3,584,696 A | 6/1971 | Eblowitz | |
| 3,594,727 A | 7/1971 | Braun | |
| 3,691,726 A | 9/1972 | Stephens et al. | |
| 4,119,194 A | 10/1978 | Freeman et al. | |
| 4,744,554 A | 5/1988 | Kulpa et al. | |
| 4,893,249 A | 1/1990 | Silverberg | |
| 5,067,088 A | 11/1991 | Schneiderhan | |
| 5,075,862 A | 12/1991 | Doeberl et al. | |
| 5,077,792 A | 12/1991 | Herring | |
| 5,510,992 A | 4/1996 | Kara | |
| 5,612,541 A | 3/1997 | Hoffmann et al. | |
| 5,612,889 A | 3/1997 | Pintsov et al. | |
| 5,708,422 A | 1/1998 | Blonder et al. | |
| 5,729,460 A | 3/1998 | Plett et al. | |
| 5,768,132 A | 6/1998 | Cordery et al. | |

(Continued)

FOREIGN PATENT DOCUMENTS

| | | |
|---|---|---|
| EP | 0571259 A1 | 11/1993 |
| WO | WO-97/40472 A1 | 10/1997 |

(Continued)

OTHER PUBLICATIONS

FedEx, "The Mobile Shipping Label", One Scan. Done just in time for this holiday season, email advertisement, Dec. 15, 2011.

(Continued)

*Primary Examiner* — Igor Borissov
(74) *Attorney, Agent, or Firm* — Norton Rose Fulbright US LLP

(57) ABSTRACT

Systems and methods which provide a reusable shipping product comprised of a reusable shipping container and reusable shipping event code are shown. A shipper may use a user device to interact with a reusable shipping event code and/or corresponding shipping event management system for facilitating operation herein. The reusable shipping event codes of embodiments provide for shipping information used in processing an item during shipment in a configuration adapted for repeated use in shipping. A shipping event code database is preferably provided, such as at a shipping event management system, wherein shipping information associated with a corresponding shipping event code may be stored, such as for use in shipping services processing of a shipped item using a reusable shipping product of embodiments herein. The reusable shipping containers of embodiments of the invention provide shipping containers which are adapted for repeated use in shipping.

2 Claims, 5 Drawing Sheets

(56) References Cited

U.S. PATENT DOCUMENTS

| | | | |
|---|---|---|---|
| 5,819,240 A | 10/1998 | Kara | |
| 5,822,739 A | 10/1998 | Kara | |
| 5,936,885 A | 8/1999 | Morita et al. | |
| 5,950,916 A * | 9/1999 | Santangelo | B65D 27/06 229/301 |
| 5,960,418 A | 9/1999 | Kelly et al. | |
| 5,983,209 A | 11/1999 | Kara | |
| 6,005,945 A | 12/1999 | Whitehouse | |
| 6,010,069 A | 1/2000 | Debois | |
| 6,010,156 A | 1/2000 | Block | |
| 6,199,055 B1 | 3/2001 | Kara et al. | |
| 6,208,980 B1 | 3/2001 | Kara | |
| 6,249,777 B1 | 6/2001 | Kara et al. | |
| 6,385,504 B1 | 5/2002 | Pintsov et al. | |
| 6,430,543 B1 | 8/2002 | Lee et al. | |
| 6,532,452 B1 | 3/2003 | Pintsov et al. | |
| 6,834,273 B1 | 12/2004 | Sansone et al. | |
| 6,853,990 B1 | 2/2005 | Thiel | |
| 7,149,726 B1 | 12/2006 | Lingle et al. | |
| 7,182,259 B2 | 2/2007 | Lubow et al. | |
| 7,225,170 B1 | 5/2007 | Ryan, Jr. | |
| 7,266,531 B2 | 9/2007 | Pintsov et al. | |
| 7,337,152 B1 | 2/2008 | Gawler | |
| 7,343,357 B1 | 3/2008 | Kara | |
| 7,458,612 B1 | 12/2008 | Bennett | |
| 7,509,291 B2 | 3/2009 | McBride et al. | |
| 7,548,612 B2 | 6/2009 | Weissman et al. | |
| 7,711,650 B1 | 5/2010 | Kara | |
| 7,778,924 B1 | 8/2010 | Ananda | |
| 7,784,090 B2 | 8/2010 | Lord et al. | |
| 7,831,518 B2 | 11/2010 | Montgomery et al. | |
| 7,831,824 B2 | 11/2010 | Abdulhayoglu | |
| 7,840,492 B2 | 11/2010 | Leung et al. | |
| 7,954,709 B1 | 6/2011 | Leon et al. | |
| 7,963,437 B1 | 6/2011 | McBride et al. | |
| 8,100,324 B1 | 1/2012 | Leon | |
| 8,155,976 B1 | 4/2012 | Rendich et al. | |
| 8,204,835 B1 | 6/2012 | Ogg | |
| 8,240,579 B1 | 8/2012 | Bennett | |
| 8,612,361 B1 | 12/2013 | Bussell et al. | |
| 8,626,673 B1 | 1/2014 | Bennett | |
| 8,775,331 B1 | 7/2014 | Tsuie et al. | |
| 9,208,620 B1 | 12/2015 | Bortnak et al. | |
| 2001/0020234 A1 | 9/2001 | Shah et al. | |
| 2001/0022060 A1 | 9/2001 | Robertson et al. | |
| 2002/0032668 A1 | 3/2002 | Kohler et al. | |
| 2002/0032784 A1 | 3/2002 | Darago et al. | |
| 2002/0052841 A1 | 5/2002 | Guthrie et al. | |
| 2002/0073050 A1 | 6/2002 | Gusler et al. | |
| 2002/0082935 A1 | 6/2002 | Moore et al. | |
| 2002/0099652 A1 | 7/2002 | Herzen et al. | |
| 2002/0143431 A1 | 10/2002 | Sansone | |
| 2003/0029914 A1 | 2/2003 | Hortman et al. | |
| 2003/0037008 A1 | 2/2003 | Raju et al. | |
| 2003/0080182 A1 | 5/2003 | Gunther | |
| 2003/0088426 A1 | 5/2003 | Benson et al. | |
| 2003/0101143 A1 | 5/2003 | Montgomery et al. | |
| 2003/0101148 A1 | 5/2003 | Montgomery et al. | |
| 2003/0115162 A1 | 6/2003 | Konick | |
| 2003/0138345 A1 | 7/2003 | Schwabe | |
| 2003/0167241 A1 | 9/2003 | Gilham | |
| 2003/0182155 A1 | 9/2003 | Nitzan et al. | |
| 2003/0187666 A1 | 10/2003 | Leon | |
| 2003/0204477 A1 | 10/2003 | McNett | |
| 2003/0233276 A1 | 12/2003 | Pearlman et al. | |
| 2003/0236709 A1 | 12/2003 | Hendra et al. | |
| 2004/0002926 A1 | 1/2004 | Coffy et al. | |
| 2004/0064422 A1 | 4/2004 | Leon | |
| 2004/0089482 A1 | 5/2004 | Ramsden et al. | |
| 2004/0112950 A1 | 6/2004 | Manduley et al. | |
| 2004/0122776 A1 | 6/2004 | Sansone | |
| 2004/0122779 A1 | 6/2004 | Stickler et al. | |
| 2004/0128264 A1 * | 7/2004 | Leung | G07B 17/0008 705/402 |
| 2004/0185827 A1 | 9/2004 | Parks | |
| 2004/0185882 A1 | 9/2004 | Gecht et al. | |
| 2004/0186811 A1 | 9/2004 | Gullo et al. | |
| 2004/0215583 A1 | 10/2004 | Elliott | |
| 2005/0033653 A1 | 2/2005 | Eisenberg et al. | |
| 2005/0065892 A1 | 3/2005 | Ryan et al. | |
| 2005/0065896 A1 | 3/2005 | Kummer et al. | |
| 2005/0065897 A1 | 3/2005 | Ryan et al. | |
| 2005/0080751 A1 | 4/2005 | Burningham | |
| 2005/0116047 A1 | 6/2005 | Lu et al. | |
| 2005/0119786 A1 | 6/2005 | Kadaba | |
| 2005/0171869 A1 | 8/2005 | Minnocci | |
| 2005/0192899 A1 | 9/2005 | Reardon | |
| 2005/0192911 A1 | 9/2005 | Mattern | |
| 2005/0237203 A1 | 10/2005 | Burman et al. | |
| 2005/0256811 A1 | 11/2005 | Pagel et al. | |
| 2005/0278263 A1 | 12/2005 | Hollander et al. | |
| 2005/0278266 A1 | 12/2005 | Ogg et al. | |
| 2006/0000648 A1 | 1/2006 | Galtier | |
| 2006/0020505 A1 | 1/2006 | Whitehouse | |
| 2006/0122947 A1 | 6/2006 | Poulin | |
| 2006/0173796 A1 | 8/2006 | Kara | |
| 2006/0220298 A1 | 10/2006 | Fairweather et al. | |
| 2006/0238334 A1 * | 10/2006 | Mangan et al. | 340/539.13 |
| 2006/0259390 A1 | 11/2006 | Rosenberger | |
| 2006/0283943 A1 | 12/2006 | Ostrowski et al. | |
| 2007/0033110 A1 | 2/2007 | Philipp et al. | |
| 2007/0073587 A1 | 3/2007 | Walker et al. | |
| 2007/0078795 A1 | 4/2007 | Chatte | |
| 2007/0080228 A1 | 4/2007 | Knowles et al. | |
| 2007/0174215 A1 | 7/2007 | Morel | |
| 2007/0185726 A1 | 8/2007 | Stickler et al. | |
| 2007/0253350 A1 | 11/2007 | Tung et al. | |
| 2007/0255664 A1 | 11/2007 | Blumberg et al. | |
| 2008/0046384 A1 | 2/2008 | Braun et al. | |
| 2009/0164392 A1 | 6/2009 | Raju et al. | |
| 2009/0212098 A1 * | 8/2009 | Stratton | B65D 27/06 229/301 |
| 2010/0312627 A1 | 12/2010 | Khechef et al. | |
| 2011/0015935 A1 | 1/2011 | Montgomery et al. | |
| 2011/0022544 A1 | 1/2011 | Kim et al. | |
| 2011/0029429 A1 * | 2/2011 | Whitehouse | 705/39 |
| 2011/0071944 A1 | 3/2011 | Heiden et al. | |
| 2011/0145107 A1 | 6/2011 | Greco | |
| 2011/0204132 A1 * | 8/2011 | Vera | B65D 27/04 229/303 |
| 2011/0225180 A1 | 9/2011 | Liao et al. | |
| 2012/0008766 A1 | 1/2012 | Robertson et al. | |
| 2012/0159603 A1 | 6/2012 | Queck | |
| 2012/0233252 A1 | 9/2012 | Vats et al. | |
| 2012/0240204 A1 | 9/2012 | Bhatnagar et al. | |

FOREIGN PATENT DOCUMENTS

| | | |
|---|---|---|
| WO | WO-02/063517 A2 | 8/2002 |
| WO | WO-03/039051 A2 | 5/2003 |
| WO | WO-03/083784 | 10/2003 |

OTHER PUBLICATIONS

Mobile Postage Stamps Via Text Messages Announced, Phone Reviews, Mobile Phones, News, Mar. 11, 2011, pp. 1-3.

"Mobile Postage stamps via text message announced", http://telecoms.cytalk.com/2011/03/mobile-postage-stamps-via-text-messages-announced/, CY.TALK Telecoms News Blog, Mar. 14, 2011 in Telecoms, Texting, pp. 1-9.

Ford, C., "Frequent Flyer Programs," Australian Accountant, 63,1, Feb. 1993, pp. 52-58.

Alexander, K.L., "U.S. Stamps Pay Tribute to Starry-Eyed Jurors", Final Edition, Calgary Herald, Calgary, Alberta, Canada, Sep. 14, 2007, 2 pgs.

Office Action issued for U.S. Appl. No. 11/353,690 dated Aug. 3, 2009, 19 pgs.

"Domestic Mail Manual Section 604", Aug. 31, 2005, 45 pages.

Anonymous, "Automated Indicia Detection System From Parascript Protects Postage Revenue for Postal Operators, Cracks Down on Fraud:—Parascript StampVerify Simplifies Complex Task of Auto-

(56) References Cited

OTHER PUBLICATIONS matically Locating and Verifying Different Types of Indicia on Envelope Images—" PR Newswire, New York, Sep. 18, 2007, 2 pages.

Unpublished U.S. Appl. No. 13/172,066 to McBride, filed Jun. 29, 2011 and entitled "Systems and Methods Using Mobile Communication Handsets for Providing Postage," 47 pages.

Unpublished U.S. Appl. No. 12/030,739 to McBride, filed Feb. 13, 2008 and entitled "Systems and Methods for Distributed Activation of Postage," 35 pages.

Unpublished U.S. Appl. No. 12/103,496 to Bortnak, filed Apr. 15, 2008 and entitled "Systems and Methods for Activation of Postage Indicia at Point of Sale," 40 pages.

Unpublished U.S. Appl. No. 11/509,309 to Leon, filed Aug. 24, 2006 and entitled "Invisible Fluorescent Ink Mark," 15 pages.

* cited by examiner

REUSABLE SHIPPING PRODUCT

CROSS-REFERENCE TO RELATED APPLICATIONS

The present invention is related to co-pending, commonly assigned U.S. patent application Ser. No. 13/110,476 entitled "Systems and Methods Using Mobile Communication Handsets for Providing Postage," filed May 18, 2011, and Ser. No. 13/286,854 entitled "Perpetual Value Bearing Shipping Labels," filed Nov. 1, 2011, the disclosures of which are hereby incorporated herein by reference.

TECHNICAL FIELD

The present invention relates generally to the shipping of items and, more particularly, to providing a reusable shipping product for use in the shipment of items.

BACKGROUND OF THE INVENTION

Shipping, mailing, or posting (collectively referred to herein as shipping) of various items, such as letters and parcels, using services such as the United States Postal Service (USPS), the United Parcel Service (UPS), and Federal Express (FedEx) has been widely used by both individuals and businesses for years. Such shipping often requires the shipper to obtain a suitable shipping container, such as an envelope, flat, box, etc. (collectively referred to herein as containers), place the objects to be shipped in the container, weigh the resulting item to be shipped, obtain and apply suitable postage or other form of payment for shipping services, and prepare a shipping label or other technique for applying delivery address information before the shipping item is introduced into the shipping stream.

The foregoing shipping process can prove problematic for many shippers, particularly individuals who do not regularly engage in shipping items. For example, an individual wishing to ship items may not have a postage meter, online postage metering account, or other suitable means by which to conveniently obtain and apply suitable postage or other form of payment for shipping services. The preparation of a shipping label, even when an individual has access to suitable printing equipment and label stock, can be quite inconvenient. For example, an individual may be required to remove paper stock from a printer, insert suitable label stock, launch a shipping label application on a computer, and input delivery address information all to print a single shipping label. Moreover, individuals wishing to ship items often find themselves in the situation of having no ready stock of containers.

Efforts have been made to simplify shipping of items. For example, the USPS has introduced various flat rate shipping containers (e.g., envelope and small, medium, and large boxes), each having a flat shipping rate associated with the use thereof such that any object(s) fitting within such a container may be shipped from and to anywhere within the United States for the corresponding flat shipping rate. Such flat rate shipping has simplified shipping for many individuals by eliminating the need for scales, rating tables, etc. The shippers still must, however, purchase postage in the amount of the flat shipping rate and apply that postage to the flat rate shipping containers prior to their use. Accordingly, many shippers wishing to take advantage of the simplified flat rate shipping must still visit a post office or other service provider in order to purchase the requisite postage.

In an effort to make the use of such flat rate shipping containers still more convenient to the shipper, the USPS provides the aforementioned flat rate shipping containers to shippers free of charge. Moreover, the USPS even provides delivery of the flat rate shipping containers to shippers upon request. Shippers must still, however, continue to endure the inconvenience of preparing and applying a shipping label or otherwise applying delivery address information to the containers. Moreover, shippers continue to find themselves in the position of not having the appropriately sized, unused containers on hand when a particular object is to be shipped.

It should be appreciated that the reuse of the aforementioned flat rate shipping containers and other containers in wide use today is problematic. For example, many such containers are destroyed or otherwise rendered unusable as a shipping container when opened by a recipient. For example, the small flat rate shipping container provided by the USPS uses a "tear-to-open" sealed flap configuration that renders the container impractical for reuse as a shipping container. Moreover, the application of delivery address information (e.g., a shipping label), proof of payment for shipping services (e.g., postage indicia), and shipping information (e.g., routing information, tracking number, special handling instructions, etc.) to the container present difficulties to their reuse. For example, such information generally must be removed, possibly destroying the container or otherwise rendering it unusable as a shipping container, or obfuscated in order not to cause confusion in the processing of the item during shipping. It is often difficult to remove or obfuscate all such information and/or completely enough so as to avoid confusion or other undesired results.

BRIEF SUMMARY OF THE INVENTION

The present invention is directed to systems and methods which provide a reusable shipping product comprised of a reusable shipping container and reusable shipping event code. Such reusable shipping products provide a ready and convenient source of shipping containers. For example, a shipper may initially purchase or otherwise acquire a reusable shipping product, use the reusable shipping container thereof to package object(s) for shipping to a recipient, using the reusable shipping event code for providing shipping information for shipping services processing by a shipping service provider. A recipient of such a shipped item may remove the object(s) from the reusable shipping container and save the reusable shipping product for later use. The reusable shipping container may thus be available to the user for shipping one or more object using the reusable shipping event code associated therewith to provide shipping information for shipping processing.

In operation according to embodiments of the invention, a shipper may use a user device (e.g., a cellular telephone, a personal digital assistant (PDA), a personal computer (PC), a tablet device, etc.) to interact with a reusable shipping event code and/or corresponding shipping event management system for facilitating operation herein. For example, a shipper may use a user device in association with a reusable shipping product herein to activate the reusable shipping event code for use as proof of payment for shipping services, to provide payment for shipping services, to provide shipping information (e.g., delivery address, special handling instructions, etc.) to be associated with the reusable shipping product, to obtain tracking information regarding the shipped item, etc.

The reusable shipping event codes of embodiments of the invention provide for shipping information used in processing an item during shipment in a configuration adapted for repeated use in shipping. For example, reusable shipping event codes may be permanently printed or otherwise disposed in or on a corresponding reusable shipping container, such as using highly stable inks or other components affixed to or embedded in a portion of the reusable shipping container so as to prevent or discourage their removal. Reusable shipping event codes of embodiments comprise a high contrast ink to facilitate both recognition of their presence and their use. Embodiments of the invention utilize a reusable shipping event code configuration (e.g., widely scannable barcode configuration) which is readily readable by a wide variety of equipment (e.g., user devices, shipping service provider devices, etc.).

A shipping event code database is preferably provided (e.g., by a postage service provider, a shipping service provider, etc.), such as at a shipping event management system, wherein shipping information associated with a corresponding shipping event code may be stored, such as for use in shipping services processing of a shipped item using a reusable shipping product of embodiments herein. For example, a shipping event code database may comprise information corresponding to reusable shipping event codes to indicate an activated/unactivated state of the reusable shipping event codes, delivery address information for a shipped item comprising a reusable shipping product bearing a corresponding reusable shipping event code, special handling instructions for a shipped item comprising a reusable shipping product bearing a corresponding reusable shipping event code, etc.

The reusable shipping containers of embodiments of the invention provide shipping containers which are adapted for repeated use in shipping. For example, reusable shipping containers may be constructed of resilient materials, such as heavy duty cardboard perhaps provided with a water resistant coating or other protective feature, light weight plastic material, composite material, etc. Reusable shipping containers of embodiments include a resealable enclosure, such as may comprise a diminishing tear-away flap, releasable adhesive, releasable fastener, spooled tying mechanism, etc. Embodiments provide flat rate reusable shipping container implementations in which fees for shipping services provided in association with a particular reusable shipping container configuration are fixed independent of the objects shipped therewith.

A delivery address information area or other information area may be provided and adapted for reuse in some embodiments of a reusable shipping container herein. For example, a build-up of removable information forms may be provided to accept written or printed information (e.g., delivery address, special handling instructions, etc.) and to allow subsequent removal and exposing of another, unused removable information form in the build-up. Additionally or alternatively, a serial information form may be provided to accept written or printed information, to allow obfuscation of previously used information and subsequent use of another portion of the serial information form.

It should be appreciated that embodiments implementing the foregoing concepts enable a simplified shipping process by foregoing the use of a traditional shipping label and proof of payment for shipping services and by allowing a container to be reusable such that one might have them at their disposal at any given point in time. Moreover, embodiments enable simplified payment for the shipping services and providing shipping information through the use of a reusable shipping event code borne by a corresponding reusable shipping container. Shippers utilizing reusable shipping products of embodiments herein are enabled to avail themselves of shipping services without the use of traditional postage metering systems, printing equipment, shipping labels, or scales. Accordingly, a convenient and readily available technique for obtaining shipping services is enabled according to embodiments of the invention.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
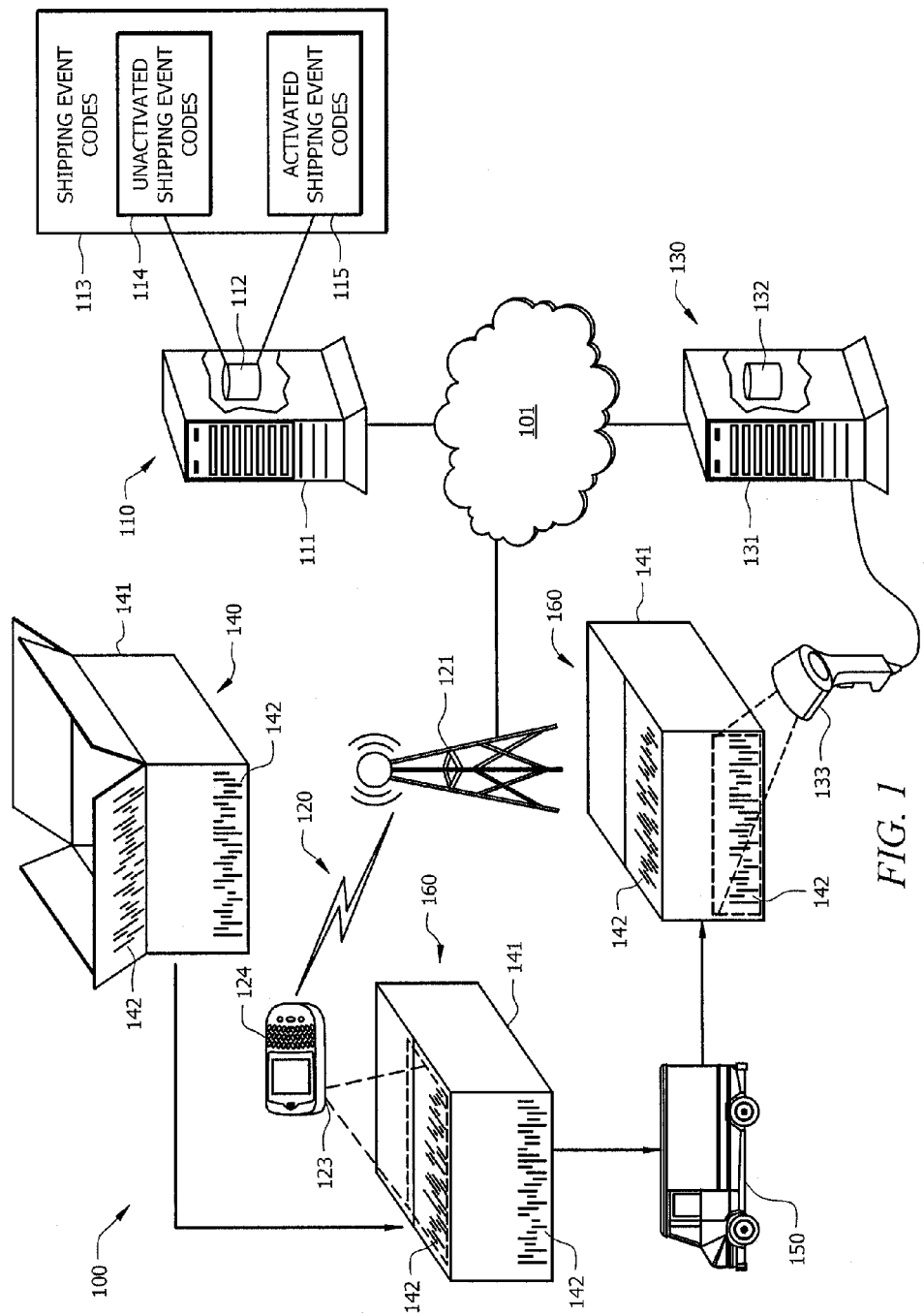
FIG. 1 shows a system adapted for obtaining shipping services using reusable shipping products according to embodiments of the invention.

Directing attention to FIG. 1, a system adapted for obtaining shipping services using reusable shipping products according to embodiments of the invention is shown as system 100. System 100 of the illustrated embodiments comprises shipping event management system 110, communication system 120, and shipping services system 130, in communication through network 101, cooperating to facilitate obtaining shipping services using reusable shipping product 140.

Network 101 of the illustrated embodiments provides information communication between shipping event management system 110, communication system 120, and shipping services system 130. The foregoing systems may be disposed locally or remotely with respect to one another. For example, shipping event management system 110 and shipping services system 130 may be disposed locally with respect to each other (e.g., at a postal system facility), whereas communication system 120 may be disposed remotely with respect to shipping event management system 110 and shipping services system 130. Of course, shipping event management system 110 and shipping services system 130 may be disposed remotely with respect to each other, if desired. Accordingly, network 101 of embodiments may comprise the Internet, an intranet, an extranet, a local area network (LAN), a metropolitan area network (MAN), a wide area network (WAN), the public switched telephone network (PSTN), a wireless network, a cable transmission system, a satellite communication network, and/or the like.

Shipping event management system 110 preferably comprises a processor-based system, such as a computer having a central processing unit (CPU), memory (shown as including database 112), and appropriate input/output (I/O) devices and interfaces, operable under control of an instruction set defining operation as described herein. For example, shipping event management system 110 may comprise server platform 111 having a processor from the CORE family of processors available from Intel Corporation. Shipping event management system 110 of the illustrated embodiment provides generation and management of reusable shipping event codes for use in facilitating shipping services using reusable shipping products as described below. Accordingly, shipping event management system 110 of the illustrated embodiment includes database 112 for storage of reusable shipping event code identification and status (e.g., as may be provided in unactivated reusable shipping event code database 114 and activated reusable shipping event code database 115).

Reusable shipping product 140 of the illustrated embodiment comprises reusable shipping container 141 and associated reusable shipping event code 142. Such reusable shipping products may be provided in various configurations, such as utilizing different shipping containers (e.g., envelopes, flats, boxes of different sizes, tubes, etc.) and/or different event code configurations (e.g., single dimensional barcodes, multi-dimensional barcodes, alphanumeric codes, radio frequency (RF) code transponders, etc.) for use with respect to shipping services.

Reusable shipping containers of embodiments comprise various forms of shipping containers adapted for reuse. For example, reusable shipping container 141 of embodiments is constructed of resilient materials, such as heavy duty cardboard perhaps provided with a water resistant coating or other protective feature, light weight plastic material, composite material, etc. The shipping container provided by reusable shipping container 141 of embodiments provides flat shipping rate implementation in which fees for shipping services provided in association with reusable shipping container 141 are fixed independent of the objects shipped therewith. For example, reusable shipping container 141 may comprise an envelope, flat, small box, medium box, or large box flat rate shipping container. It should be appreciated that, although a single reusable shipping container is shown in the embodiment of FIG. 1 for simplicity, a plurality of such reusable shipping containers, preferably in different sizes and/or configurations, are provided according to embodiments for use in obtaining shipping services according to the concepts herein.

Figure 2A:
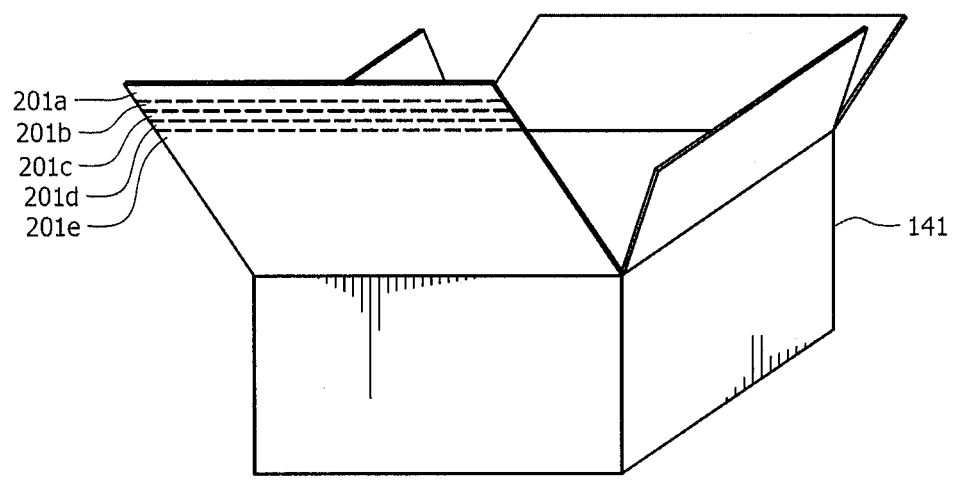
FIGS. 2A-2D show embodiments of a reusable shipping container of a reusable shipping product herein.

Reusable shipping container 141 preferably includes a resealable enclosure. For example, reusable shipping container 141 may comprise a resealable enclosure configuration which uses a diminishing tear-away flap as shown in FIG. 2A. In the diminishing tear-away flap configuration illustrated in FIG. 2A, container flap portions 201*a*-201*e* are separated by perforation lines to facilitate resealing of the container. Each of flap portions 201*a*-201*e* may have a pressure sensitive adhesive (not shown) on a back side of the flap portion. When reusable shipping container 141 is used for a first time, a protective covering (e.g., removable paper strip) may be removed from the pressure sensitive adhesive on the back of flap portion 201*a* and the flap pressed against a top surface of one or more of the other flaps enclosing the interior of reusable shipping container 141. Reusable shipping container 141 may then be opened by a recipient by separating flap portion 201*a* from flap portion 201*b* at the perforation line therebetween. When the reusable shipping container is reused, a protective covering may be removed from the pressure sensitive adhesive on the back of flap portion 201*b* and the flap pressed against a top surface of one or more of the other flaps enclosing the interior of reusable shipping container 141. Thus, reusable shipping container 141 may be reused a number of times.

Figure 2B:
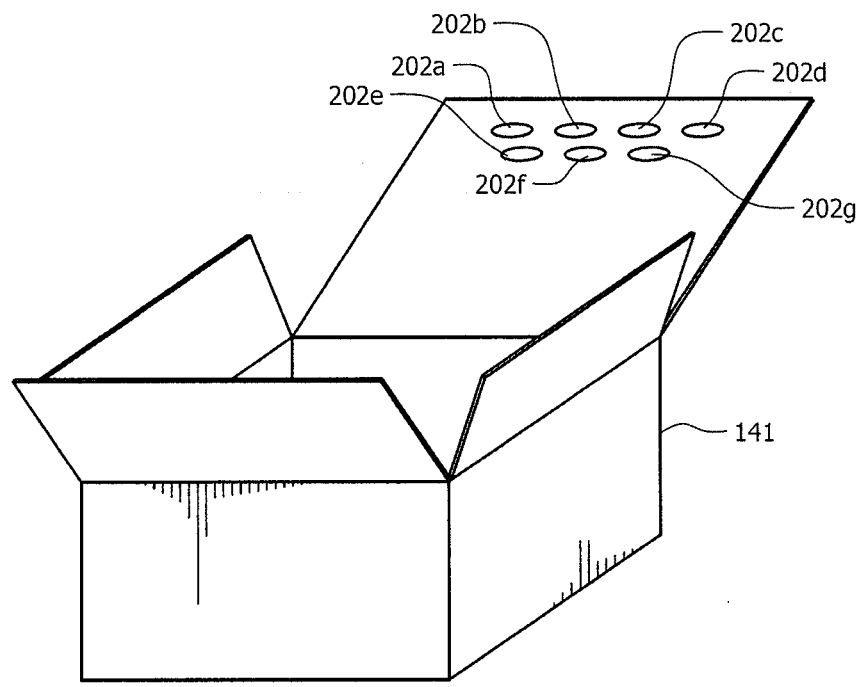

An implementation using releasable adhesive is another example of a resealable enclosure configuration as may be utilized according to embodiments of the invention. For example, reusable shipping container 141 may comprise a plurality of releasable adhesive portions on a flap thereof, as shown by releasable adhesive portions 202*a*-202*g* of FIG. 2B, for use in sealing the shipping container. The releasable adhesive may comprise a binary adhesive configuration in which a pressure sensitive adhesive and neutralizing agent are provided (e.g., the COMMAND adhesive product available from 3M) in order to facilitate release of the adhesive when desired. When reusable shipping container 141 is used, a protective covering (e.g., removable paper strip) may be removed from the pressure sensitive adhesive of releasable adhesive portion 202*a* and the flap pressed against a top surface of one or more of the other flaps enclosing the interior of reusable shipping container 141. Reusable shipping container 141 may then be opened by a recipient by activating the neutralizing agent of releasable adhesive portion 202*a* (e.g., pulling a neutralizing agent tab exposed at the edge of the sealed flap) to allow separation of the flap from one or more other flaps enclosing the interior of reusable shipping container 141. When the reusable shipping container is reused, a protective covering may be removed from the pressure sensitive adhesive of releasable adhesive portion 202*b* and the flap pressed against a top surface of one or more of the other flaps enclosing the interior of reusable shipping container 141. Thus, reusable shipping container 141 may be reused a number of times.

Figure 2C:
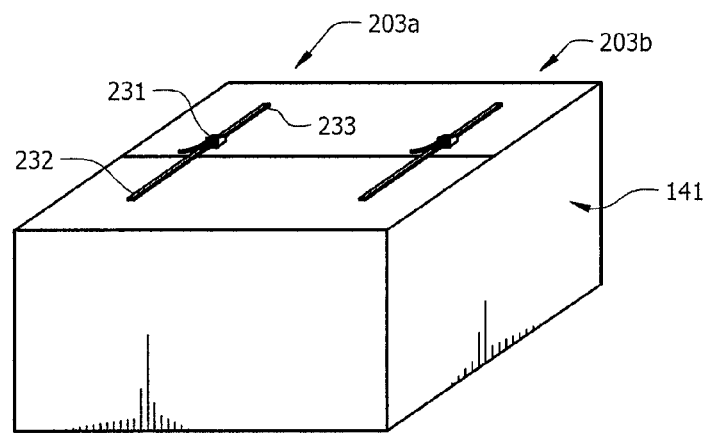

A releasable fastener may provide another implementation of a resealable enclosure configuration as may be utilized according to embodiments of the invention. For example, reusable shipping container 141 may comprise one or more releasable fasteners, as shown by releasable fasteners 203*a* and 203*b* of FIG. 2C, for use in sealing the shipping container. Releasable fasteners 203*a* and 203*b* of the illustrated embodiment include strap portions 232 and 233 affixed to different portions of shipping container 141 (e.g., flaps thereof). The strap portions may be releasably coupled using fastener 231. Fastener 231 provides releasable coupling of strap portions 232 and 233, such as by being permanently attached to one strap and releasably engaging the other strap. For example, fastener 231 of an embodiment may comprise a ratchet mechanism allowing a first strap to be inserted into the ratchet mechanism attached to the second strap while preventing the first strap from being removed from (e.g., "backed out" of) the ratchet mechanism. The pawl of the ratchet mechanism may be subsequently manipulated, perhaps using a special tool, to facilitate release of the first strap from the ratchet mechanism, and thus the second strap. This coupling and release may be repeated to thereby facilitate the reuse of reusable shipping container 141 a number of times.

Figure 2D:
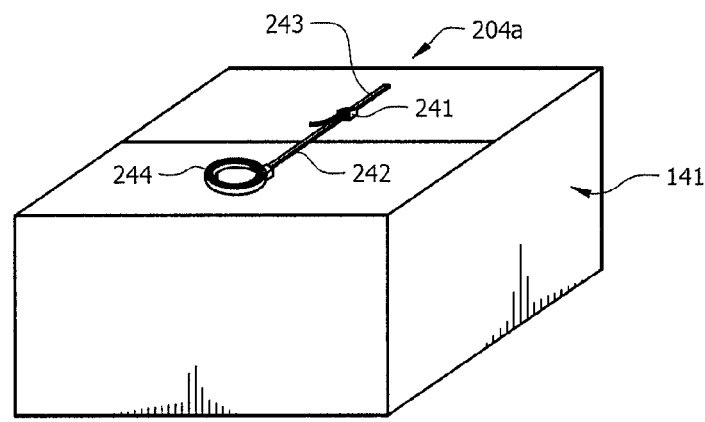

An implementation using a spooled tying mechanism is another example of a resealable enclosure configuration as may be utilized according to embodiments of the invention. For example, reusable shipping container 141 may comprise one or more spool fastener mechanisms, as shown by spooled fastener 204a of FIG. 2D, for use in sealing the shipping container. Spooled fastener 204a of the illustrated embodiment include strap portions 242 and 243 affixed to different portions of shipping container 141 (e.g., flaps thereof). Strap portion 242 comprises a spooled length of strap contained and dispensed from spooling mechanism 244. The strap portions may be releasably coupled using fastener 241. Fastener 241, which is permanently coupled to strap portion 243, provides coupling of strap portions 242 and 243 through a one-way strap insertion interface. For example, fastener 241 of an embodiment may comprise a ratchet mechanism allowing a first strap to be inserted into the ratchet mechanism attached to the second strap while preventing the first strap from being removed from (e.g., "backed out" of) the ratchet mechanism. In order to open reusable shipping container 141 when sealed using spooled fastener 204a of embodiments, strap portion 242 may be cut on the spooling mechanism side of fastener 241. Thereafter, the separated part of strap portion 242 may be pulled through the ratchet mechanism of fastener 241, strap portion 242 extended from spooling mechanism 244, and again engaged in the ratchet mechanism of fastener 241 through the one-way strap insertion interface. This coupling, cutting, and removal may be repeated to thereby facilitate the reuse of reusable shipping container 141 a number of times.

Although particular examples of resealable enclosure configurations are provided above, it should be appreciated that the concepts of the invention are not limited to use of the particular examples given. Accordingly, embodiments of the invention may implement additional or alternative techniques for providing resealable functionality with respect to a reusable shipping container. For example, the use of packing tape to seal the shipping container may be utilized according to embodiments of the invention, although such embodiments provide implementations in which the reuse of the shipping container is likely to be limited to a very few reuses (e.g., due to damage to the shipping container, from build-up of the sealing material, etc.) Moreover, combinations of a plurality of resealable enclosure configurations may be utilized according to embodiments of the invention.

Figure 3:
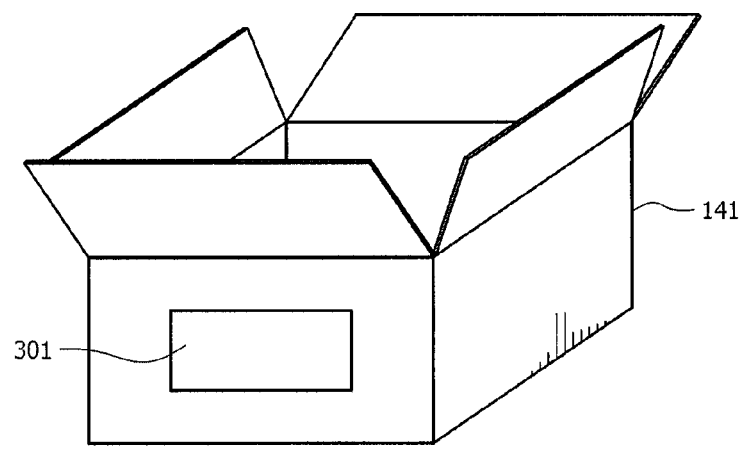
FIG. 3 shows an embodiment of a reusable shipping container having an information area thereon.

Reusable shipping container 141 of embodiments may comprise additional adaptation to facilitate reuse according to the concepts herein. For example, a delivery address information area or other information area, shown as information area 301 in FIG. 3, may be provided and adapted for reuse in some embodiments, such as where a shipping service provider does not have infrastructure deployed (or fully deployed) which is capable of accessing delivery address information using a reusable shipping event code (as discussed below). Information area 301 of embodiments of reusable shipping container 141 comprises a build-up of removable information forms which are adapted to accept written or printed information (e.g., delivery address, special handling instructions, etc.) and to allow subsequent removal and exposing of another, unused removable information form in the build-up. Additionally or alternatively, information area 301 of embodiments of reusable shipping container 141 comprises a serial information form to accept written or printed information, to allow obfuscation of previously used information (e.g., by marking over the previous information) and subsequent use of another portion of the serial information form.

Although not shown in the illustrated embodiment, it should be appreciated that reusable shipping container 141 may include features in addition to or in the alternative to those discussed above. For example, reusable shipping container 141 may include additional printed matter, such as a facing identification mark (FIM), instructions for use/reuse, rate information (e.g., notation that a fixed rate will be applicable to shipping services using the container, special services available when using the container for shipping services, etc.), promotional messages (e.g., brand names, logos, uniform resource locators (URLs), slogans, etc.), and/or the like.

Referring again to FIG. 1, reusable shipping event code 142 of reusable shipping product 140 is adapted to provide shipping information used in processing an item during shipment. Accordingly, reusable shipping event code 142 of the illustrated embodiment is borne by reusable shipping container 141 so as to be accessible to a shipper and shipping service provider. Embodiments of reusable shipping event code 142 are permanently affixed to reusable shipping container 141, such as to prevent misuse of the reusable shipping event code (e.g., application to a different sized shipping container), to prevent accidental separation of the reusable shipping event code and reusable shipping container (e.g., resulting in the corresponding shipping information no longer being associable with the reusable shipping container), etc.

Reusable shipping event code 142 is preferably adapted for repeated use in shipping. For example, reusable shipping event code 142 of embodiments is permanently printed or otherwise disposed in or on reusable shipping container 141. Reusable shipping event code 142 of embodiments is printed using highly stable inks or other components affixed to or embedded in a portion of the reusable shipping container so as to prevent or discourage their removal. The aforementioned reusable shipping event codes may be printed using special inks, such as may comprise special ink colors (e.g., unique colored inks, inks which appear to shift color in changing light or viewing angles, etc.) and/or inks having special properties (e.g., fluorescent inks, phosphorescent inks, thermochormatic inks, magnetic inks, bi-stable inks, etc.) according to embodiments herein.

To facilitate obtaining shipping services according to embodiments herein, reusable shipping event code 142 may be disposed in a plurality of locations of reusable shipping container 141 to provide convenient access to reusable shipping event code 142 when reusable shipping container 141 is disposed in a number of different orientations. Additionally or alternatively, reusable shipping event code 142 of embodiments comprises a high contrast ink to facilitate both recognition of the presence of the reusable shipping event code and the use of the reusable shipping event code.

To further facilitate use according to the concepts herein, embodiments of the invention utilize a reusable shipping event code configuration which is readily readable by a wide variety of equipment (e.g., user devices, shipping service provider devices, etc.). For example, reusable shipping event code 142 may comprise a widely scannable configuration, such as using a relatively simple barcode (e.g., single dimensional barcode) configuration. Such a widely scannable configuration may, for example, comprise a bar and half-bar barcode configuration (e.g., POSTNET barcode configuration), an ascending and descending bar barcode configuration (e.g., Intelligent Mail barcode configuration), a dimensional based barcode configuration (e.g., Universal Product code barcode configuration and the USPS Intelligent Mail Package Barcode (IMPB)), etc. Such relatively simple code configurations facilitate error free printing of the barcode and scanning by devices having fewer resources or functional capabilities. Embodiments of the invention, however, may utilize more complex scannable configurations, if desired, such as to provide data redundancy, continued operability when a portion of the code is damaged, etc. For example, embodiments of reusable shipping event code 142 may comprise a two-dimensional barcode (e.g., PDF417 barcode, QR code barcode, data matrix barcode, etc.). It should be appreciated, however, that reusable shipping event code 142 is not limited to embodiments comprising a barcode. For example, reusable shipping event code 142 of embodiments may comprise alphanumeric codes (e.g., clear text or cryptographic text strings), RF code transponders (e.g., RF identification (RFID) tags), etc.

Reusable shipping event codes utilized according to embodiments of the invention may be provided in a form or format which is compatible with or otherwise readily acceptable to a shipper, a shipping service provider, etc. in order to facilitate their acceptance, adoption, and use. For example, reusable shipping event code 142 of embodiments herein may comprise a format which is consistent with another code (e.g., tracking codes) implemented by the shipping service provider for another purpose in order to facilitate compatibility with shipping service provider infrastructure. Although being formatted so as to be compatible with another code, embodiments of reusable shipping event codes are nevertheless unique and readily distinguishable from such codes, such as through using a reserved embedded identification code portion, set of most significant bits, etc.

Access to shipping information (e.g., delivery address information, payment for services, special handling instructions, rerouting information, etc.) regarding the provision of shipping services to a shipped item comprised of reusable shipping product 140 is provided through use of reusable shipping event code 141 of embodiments. Accordingly, embodiments of reusable shipping event code 141 may comprise various forms of symbols (e.g., barcodes, character strings, etc.) adapted for reuse which provide substantially unique identification information (e.g., as may be generated by shipping event management system 110 of embodiments) used to access corresponding shipping information. Substantially unique information as used herein means that the information is unique in normal use of the reusable shipping event codes. For example, after a period of time (e.g. months or years) sufficient to accommodate the reusable life of reusable shipping product 140, the information may repeat.

Shipping information associated with a reusable shipping event code is stored in a shipping event code database, indexed or otherwise referenced by a corresponding reusable shipping event code, according to embodiments of the invention. For example, shipping event code database 113, hosted by shipping event management system 110 in the illustrated embodiment, may be provided by a postage service provider, a shipping service provider, etc. Such a shipping event code database may provide information regarding an activated/unactivated state of the reusable shipping event code, information regarding payment for shipping services provided with respect to a shipped item comprising the reusable shipping product, delivery address information, return address information, user account information, special services (e.g., tracking services, delivery confirmation, expedited delivery, certified delivery, class of service, handling instructions, carrier pickup of the shipping item, etc.) to be provided with respect to the reusable shipping product, etc. For example, shipping event code database 113 of the illustrated embodiment comprises unactivated shipping event codes database 114 and activated shipping event codes database 115 to indicate an activated/unactivated state of the reusable shipping event codes (e.g., an "activated" state indicating postage paid, proof of payment for shipping services, suitable post paid account information provided, etc.). Accordingly, a record for a particular reusable shipping event code may be moved from unactivated shipping event codes database 114 to activated shipping event codes database 115 when the reusable shipping event code is activated (e.g., when payment for shipping services is provided or when information regarding a post paid account suitable for payment for shipping services is provided). Correspondingly, a record for a particular reusable shipping event code may be moved from activated shipping event codes database 115 to unactivated shipping event codes database 114 when the reusable shipping event code is unactivated (e.g., upon completion of shipping services, upon "cancellation" of the proof of payment for shipping services, etc.).

The aforementioned records for particular reusable shipping event codes preferably store shipping information relevant to shipping services to be provided to a shipped item comprised of a reusable shipping product herein. For example, when stored in unactivated shipping event codes database 114 and/or activated shipping event codes database 115, the record for a reusable shipping event code may comprise delivery address information for a shipped item comprising a reusable shipping product bearing a corresponding reusable shipping event code, special handling instructions for a shipped item comprising a reusable shipping product bearing a corresponding reusable shipping event code, etc. This shipping information may thus be accessed during provision of shipping services using the reusable shipping services code to access the corresponding record in activated shipping event codes database 115.

Shipping event management system 110 preferably records the foregoing information of reusable shipping event codes 142 for use in indicating unactivated and activated states of the particular reusable shipping event codes. For example, when initially generated and unactivated, the substantially unique identification information of reusable shipping event codes 142 may be stored in shipping event code database 113, such as part of the data of unactivated reusable shipping event codes database 114. Once a reusable shipping event code is activated, however, the substantially unique identification information of a reusable shipping event code, preferably with appropriate shipping information, is stored in activated reusable shipping event codes database 115, such as for use by shipping services system 130 in determining if postage value is associated with a particular reusable shipping event code. Accordingly, as part of an activation process, substantially unique identification information for a previously unactivated reusable shipping event code may be moved from unactivated reusable shipping event codes database 114 to activated reusable shipping event codes database 115.

Although shown as a single system for simplicity, shipping event management system 110 of embodiments may be implemented as a plurality of platforms. For example, separate platforms may be used to generate, activate, unactivate, and/or manage reusable shipping event codes. Printing of reusable shipping event codes on, or otherwise providing reusable shipping event codes on or in, a reusable shipping container may be provided under control of shipping event management system 110 or separately therefrom, such as where container manufacturers or other stock manufacturers include reusable shipping event codes for postage indicia on various forms of envelopes and/or other stationary items at the time of manufacture.

Communication system 120 preferably comprises a communication network, represented by communication network system 121, and a plurality of user devices, a representative one of which is user device 124. User devices utilized according to embodiments of the invention may comprise various configurations, such as cellular telephones, PDAs, PCs, tablet devices, etc., adapted to provide information regarding a reusable shipping event code to shipping event management system 110 for facilitating operation herein. In accordance with an embodiment of the present invention, communication system 120 may provide a wireless communication network, such as may comprise a cellular telephone network (e.g., a Global System for Mobile Communications (GSM) network, an International Mobile Telecommunications-2000 (IMT-2000 or 3G) network, a long term evolution (LTE) network, a 4G network, etc.), a wireless broadband data network (e.g., a wireless LAN network, a WiFi network, a WiMAX network, a general packet radio service (GPRS) network, etc.), and/or the like providing communication to/from user equipment including mobile communication handsets. It should be appreciated that, although communication system 120 has been described above with reference to wireless communication networks, embodiments of communication system 120 may comprise wired networks, such as the Internet, an intranet, an extranet, a LAN, a MAN, a WAN, the PSTN, a cable transmission system, and/or the like.

User device 124 preferably comprises a processor-based system, such as computers having a CPU, memory, and appropriate I/O devices and interfaces, operable under control of instruction sets defining operation as described herein. For example, communication system 120 may comprise a smart phone (e.g., an IPHONE available from Apple Computer Corp., an ANDROID based phone available from various manufacturers, a BLACKBERRY available from Research In Motion, etc.), a network enabled personal digital assistant (e.g., an IPAQ available from Hewlett Packard Corp., an IPAD available from Apple Computer Corp., etc.), and/or the like. User device 124 of embodiments may operate under control of an instruction set (e.g., a smart phone application adapted for use in obtaining shipping services using reusable shipping products according to embodiments of the invention) to provide operation as described herein. Additionally or alternatively, resources of user device 124 not specifically adapted for obtaining shipping services using reusable shipping products may be used. For example, embodiments may utilize a network browser application, a text messaging (e.g., SMS) application, an email client application, etc. in obtaining shipping services using reusable shipping products according to embodiments of the invention herein.

In addition to or in the alternative to the foregoing, user devices of embodiments may utilize various applications to facilitate obtaining shipping services using reusable shipping products. For example, an application adapted to decode one or more symbols (e.g., barcode, characters, etc.) appearing in an image to derive appropriate data from image data may be utilized according to embodiments of the invention.

Communication system 120 preferably provides communication of reusable shipping event code identification information and shipping information to shipping event management system 110 for activation of reusable shipping event codes for obtaining shipping services using reusable shipping products according to the concepts of the present invention. Accordingly, the illustrated embodiments of user device 124 includes scanning apparatus 123 (e.g., digital camera circuitry, barcode scanning circuitry, RF scanning circuitry, etc.) for scanning reusable shipping event codes, as will be discussed in further detail below. Of course, other forms of input of information regarding the forgoing information may be utilized according to embodiments of the invention, such as a keyboard of a user device.

Although shown as integrated components in the embodiment illustrated in FIG. 1, it should be appreciated that user device 124 and scanning apparatus 123 may comprise different configurations than that shown. For example, scanning apparatus 123 may be provided as a module coupled to user device 124 via a data interface thereof.

Reusable shipping event code information and shipping information for use in obtaining shipping services using reusable shipping products, such as mail piece information, user identification information, account information, special handling information, delivery address information, etc., is preferably provided by user device 124 to shipping event management system 110 for activation of reusable shipping event codes and obtaining shipping services using reusable shipping products. Accordingly, a communication interface of user device 124 (e.g., a radio transceiver) may be utilized to communicate with shipping event management system 110 via communication network system 121 and network 101. It should be appreciated that, although embodiments are described herein with reference to the use of wireless links with respect to mobile communication handsets, embodiments of the invention may utilize wired connections (e.g., an Ethernet link, a universal serial bus (USB) link, a fiber optic link, etc.) with respect to mobile communication handsets.

Shipping services system 130 preferably comprises a processor-based system, such as a computer having a CPU, memory (shown as including database 132), and appropriate input/output (I/O) devices and interfaces, operable under control of an instruction set defining operation as described herein. For example, shipping services system 130 may comprise server platform 131 having a processor from the CORE family of processors available from Intel Corporation. Shipping services system 130 of the illustrated embodiments provides scanning and validation of reusable shipping event codes borne on reusable shipping containers of shipped items as described below. Accordingly, shipping services system 130 of the illustrated embodiments includes database 132 for storage of validation information (e.g., reusable shipping event code identification, status, shipping information, etc.) and mail piece scanner 133 for scanning and processing shipped items.

It should be appreciated that configurations of shipping services system 130 other than that illustrated may be utilized according to embodiments of the invention. For example, mail piece scanner 133 may be coupled to shipping event management system 110, such as through network 101, for performing validation as described herein without server platform 131, if desired.

Figure 4:
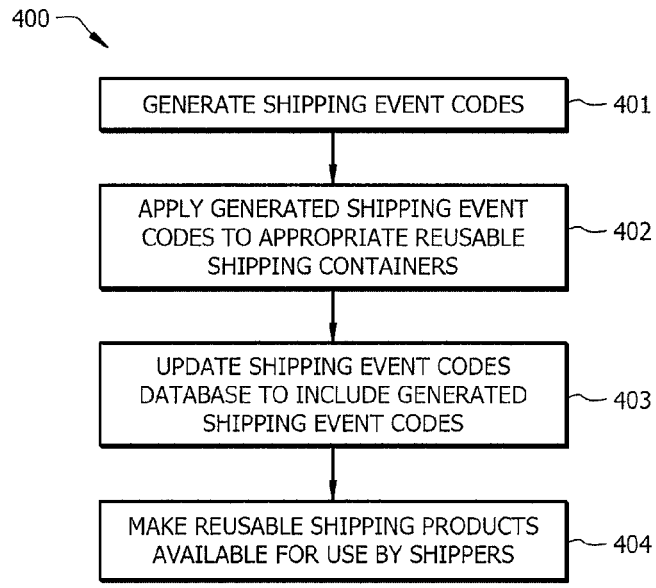
FIG. 4 shows a flow diagram of operation to initially provide reusable shipping products according to embodiments of the invention.
Figure 5:
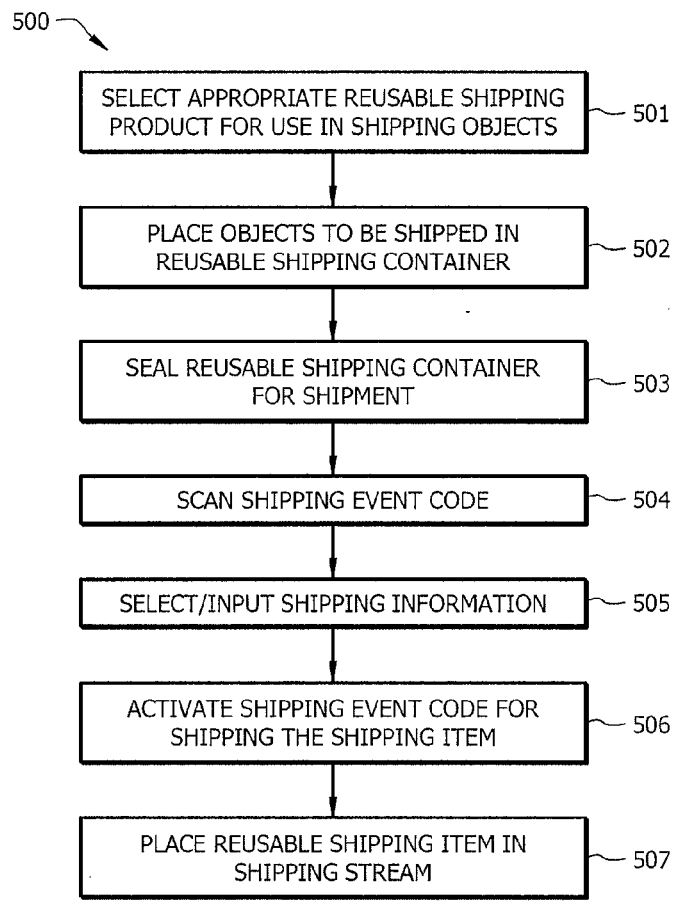
FIG. 5 shows a flow diagram of operation whereby a shipper utilizes a reusable shipping product in obtaining shipping services according to embodiments of the invention.
Figure 6:
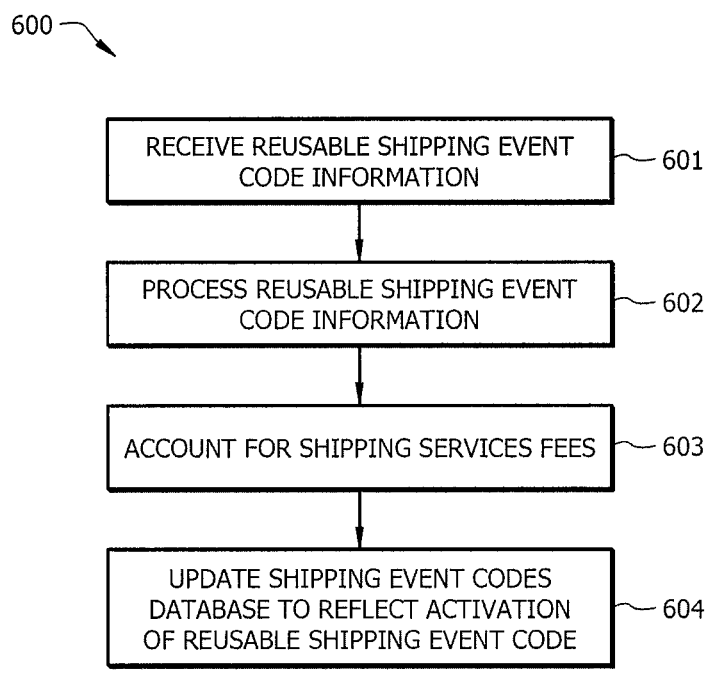
FIG. 6 shows a flow diagram of operation whereby a shipping event management system operates to facilitate shipping services using a reusable shipping product according to embodiments of the invention.

Operation of embodiments of systems 100 illustrated in FIG. 1 for obtaining shipping services using reusable shipping products according to the concepts herein is represented in the flow diagrams of FIGS. 4-6. Specifically, the flow diagram of FIG. 4 shows operation to initially provide reusable shipping products according to embodiments of the invention. The flow diagram of FIG. 5 shows operation whereby a shipper utilizes a reusable shipping product in obtaining shipping services according to embodiments of the invention. Correspondingly, the flow diagram of FIG. 6 shows operation whereby a shipping event management system operates to facilitate shipping services using a reusable shipping product according to embodiments of the invention. It should be appreciated that, although an order of events is provided in the flow diagrams of FIGS. 4-6 in order to aid in the understanding of the invention, the concepts herein are not limited to the particular order of events in the illustrated embodiments.

In operation according to the embodiment illustrated in FIG. 4, at block 401 shipping event codes (e.g., shipping event code 142) are generated for use in reusable shipping products herein (e.g., reusable shipping product 140). For example, a manufacturer (e.g., a postage service provider such as Stamps.com, Inc.) may utilize shipping event management system 110 to generate unactivated reusable shipping event codes that may be used in obtaining shipping services using reusable shipping products at block 401. Each such reusable shipping event code is preferably unique or substantially unique so as to facilitate accurate validation, accounting, and/or auditing with respect to the activation and use thereof. In particular, the generated reusable shipping event codes of embodiments provide substantially unique identification information used to access corresponding shipping information for facilitating shipping services using reusable shipping products herein.

The substantially unique identification information of reusable shipping event codes of embodiments may itself provide information (i.e., without reference to information in a separate database). For example, embodiments of reusable shipping event codes may use special codes therein to indicate such information as particular sizes/forms of shipping container, particular shipping service providers, particular shipping services, etc. associated with the reusable shipping event codes.

At block 402 the generated reusable shipping event codes are applied to corresponding, appropriate reusable shipping containers (e.g., reusable shipping container 141) to provide a reusable shipping product (e.g., reusable shipping product 140). For example, the reusable shipping event codes may each be printed upon a reusable shipping container having attributes (e.g., size, configuration, flat fee, special services, etc.) consistent with the particular reusable shipping event code. Such reusable shipping event codes may be printed on one or more surface of a corresponding reusable shipping container using highly stable inks. Additionally or alternatively, the generated reusable shipping event codes may be otherwise affixed to or embedded in corresponding reusable shipping containers, such as through encoding in an RF identification tag embedded in a portion of the reusable shipping container, chemically bonded into a material of the reusable shipping container, etc.

Reusable shipping event codes of embodiments of the invention may be applied to corresponding reusable shipping containers alone or in combination with various images, information, characters, symbols, ornamental images, and/or marks (collectively referred to as marks). For example, reusable shipping event codes may be printed alone, with one or more marks used to facilitate shipping processing (e.g., a facing identification mark (FIM)), with human readable information, with one or more indicator marks, and/or the like. Such marks may be used in preparing mail items, processing mail items, for aesthetic or other purposes, etc.

A shipping event codes database (e.g., shipping event codes database 113) is updated to include the generated reusable shipping event codes at block 403 of the illustrated embodiment. For example, when reusable shipping event codes 142 are generated, shipping event management system 110 may store a unique code identifying each generated reusable shipping event code in shipping event codes database 113 along with a status identifier indicating the reusable shipping event codes are "unactivated". As discussed below, the status identifier may be updated upon activation of the reusable shipping event codes when payment for shipping services has been made or otherwise been provided for to indicate a reusable shipping event code is "activated". Such status identifiers may be useful with respect to validation of the reusable shipping event codes, as discussed further below. The aforementioned status identifiers may comprise a data field stored in association with a reusable shipping event code and/or may be provided by storage of the reusable shipping event codes themselves. For example, the generated reusable shipping event codes may be stored in unactivated shipping event codes database 114 when their status is "unactivated" and moved to activated shipping event codes database 115 when their status is "activated". Of course, the reusable shipping event codes may again be moved to unactivated shipping event codes database 114 from activated shipping event codes database 115 when they are again unactivated.

Additional or alternative information which may be stored in association with reusable shipping event codes may include an entity generating the reusable shipping event codes (e.g., a service provider generating the reusable shipping event codes), identification of a system used to generate the reusable shipping event codes, cryptographic keys used for encrypting/decrypting information in the reusable shipping event codes, digital signatures used to authenticate the reusable shipping event codes, particular services and/or levels of service shipped items using the reusable shipping event code may be used for, and/or the like. Such additional information may be used in an audit trail with respect to any particular reusable shipping event code, used to detect fraud or abuse of reusable shipping event codes, used for accounting purposes, used to restrict or manage the use of reusable shipping event codes, etc.

Updating of a shipping event codes database at block 403 according to embodiments herein provides an index or other relational database for use in providing shipping information associated with the reusable shipping event codes. For example, the generated reusable shipping event codes may be stored in shipping event codes database 113 with certain initial shipping information (e.g., information regarding the configuration of reusable shipping container to be used with the reusable shipping event code, the flat fee to be associated with use of the reusable shipping event code, etc.), until activated for use with respect to a desired shipping service. Accordingly, shipping information relevant to the reusable shipping container bearing a reusable shipping event code (e.g., size, configuration, flat fee, special services, etc.) may correspondingly be stored in shipping event codes database 113 in association with the reusable shipping event codes at block 402. For example, if the generated shipping event codes are stored as records in unactivated shipping event codes database 114, fields of the appropriate record may be updated to include information relevant to the reusable shipping container ultimately bearing the shipping event code. Such information may be utilized in facilitating providing shipping services using a reusable shipping product of embodiments of the invention, such as to determine shipping rates, to offer and/or provide relevant shipping and/or special services, etc.

At block 404 of the illustrated embodiment, reusable shipping products comprising reusable shipping containers bearing a corresponding reusable shipping event code are made available for use by shippers. For example, reusable shipping products may be provided, possibly free of charge, as shipping supplies by a shipping service provider (e.g., USPS, UPS, FedEx, etc.), a postage service provider (e.g., Stamps.com, Inc.), a retailer (e.g., Office Depot, Office Max, Walmart, etc.), a mass shipper (e.g., Amazon.com, Bestbuy.com, Walmart.com, etc.), and/or the like. Accordingly, a shipper may be provided reusable shipping products herein by obtaining them directly at a depot or other location providing such products, by direct delivery of reusable shipping products to the shipper for their use, by delivery of shipped items comprised of reusable shipping products, etc.

Having described operation to initially provide reusable shipping products according to the embodiment illustrated in FIG. 4, attention is directed to FIG. 5 for operation whereby a shipper utilizes a reusable shipping product in obtaining shipping services according to an embodiment of the invention. For example, a shipper (e.g., an individual, a business, etc.) may wish to ship one or more objects (e.g., letters, goods, etc.) using the services of a shipping service provider (e.g., USPS, UPS, FedEx, etc.) and thus may desire to use a reusable shipping product of embodiments herein.

At block 501 of the illustrated embodiment, the shipper selects an appropriate reusable shipping product (e.g., reusable shipping product 140) for use in shipping their objects. For example, the shipper may select an appropriate reusable shipping product from a plurality of reusable shipping products used as shipping containers for objects previously shipped to the shipper, from a plurality of reusable shipping products provided to the shipper by the shipping service provider as shipping stock, etc. A reusable shipping product may be selected as appropriate based upon size (e.g., sized to accommodate the object(s) to be shipped), services available using the reusable shipping product (e.g., delivery schedule, special services, international delivery, etc.), fee structure (e.g., flat fee amount, etc.), and/or the like.

The shipper places the object(s) to be shipped into the reusable shipping container (e.g., reusable shipping container 141) of the selected reusable shipping product at block 502. Thereafter, at block 503 of the illustrated embodiment the shipper seals the reusable shipping container containing the object(s) for shipment. Thus, the selected reusable shipping product with the objects contained within the reusable shipping container thereof become a shipping item (e.g., shipping item 160) for receiving shipping services from one or more shipping service provider.

It should be appreciated that, at this point in the exemplary embodiment, payment for the shipping services has not been made or otherwise provided for (e.g., identifying an account from which payment for shipping services is to be made). Likewise, no information regarding a delivery address for the shipping item (e.g., shipping item 160) has been provided. The reusable shipping event code (e.g., reusable shipping event code 142) borne by the reusable shipping container (e.g., reusable shipping container 141) is utilized according to embodiments of the invention to facilitate payment for the shipping services and/or to provide shipping information such as the delivery address for the shipping item. Accordingly, a shipper may use a user device (e.g., a cellular telephone, a PDA, a PC, a tablet device, etc.) to interact with a reusable shipping event code and/or corresponding shipping event management system for facilitating shipping services with respect to the shipping item.

In operation according to embodiments of the invention, the reusable shipping event code (e.g., reusable shipping event code 142) borne by the reusable shipping container of the selected reusable shipping product is scanned using a user device (e.g., user device 124) at block 504. For example, an imaging apparatus (e.g., camera, barcode scanner, etc.) of a user device (e.g., cellular telephone, PDA, PC, tablet device, etc.) may be used to scan the reusable shipping event code borne on a surface of the reusable shipping container. Embodiments of the invention utilize an instruction set (e.g., an application, an applet, widget, etc.) adapted to identify the reusable shipping event code in an image and to extract information therefrom (e.g., a digital representation of the substantially unique code of the reusable shipping event code) for use as described below. Such an instruction set may be launched under control of the shipper, such as when preparing the shipping item for shipment. Alternatively, such an instruction set may be launched automatically or otherwise execute independent of user selection, such as by monitoring image data provided by the imaging apparatus to recognize the presence of a reusable shipping event code therein.

Although embodiments are described above with reference to the use of an imaging apparatus, it should be appreciated that scanning of a reusable shipping event code for operation herein need not employ imaging apparatus. For example, user device 124 may comprise a RF identification reader for use with a RF identification transponder having the reusable shipping event code therein.

At block 505 of the illustrated embodiment various shipping information relevant to the shipping services desired with respect to the shipping item (e.g., shipping item 160) comprised of the reusable shipping product (e.g., reusable shipping product 140 having reusable shipping container 141 and reusable shipping event code 142) are provided. For example, the aforementioned instruction set operable upon the user device may be utilized for input and/or selecting various shipping information. In operation according to embodiments of the invention, the shipper may be enabled to select a delivery address for the shipping item from an address book (e.g., an address book stored by the user device, available to the user device via a network connection, etc.) to provide for delivery address identification with a minimum of input. Additionally or alternatively, the shipper may be enabled to input delivery address information, if desired.

Embodiments of the invention may additionally or alternatively provide for delivery address identification from sources external to the shipper or the shipper's systems. For example, the shipper may select a "return to sender" option to cause the delivery address to be the previous sender address for the reusable shipping product (e.g., where a vendor has provided a replacement part for which the replaced part is to be returned to the vendor). The previous sender address information may be retrieved from the shipping information of shipping event codes database 113 and updated as the delivery address information for the scanned reusable shipping event code. As another example of identification of delivery address information from sources external to the shipper's systems, various Internet or world wide web databases may be accessed for delivery address information identification. For example, the shipper may input a recipient's name or portion thereof, perhaps along with some other information (e.g., city, state, business name, or the like), for a world wide web search of potential delivery addresses from which the shipper may make a selection.

Where a delivery address information area or other information area (e.g., information area 301 in FIG. 3) is provided in association with a reusable shipping product (e.g., where a shipping service provider does not have infrastructure deployed (or fully deployed) which is capable of accessing delivery address information using a reusable shipping event code) the shipper may write or otherwise cause delivery address information and/or other shipping information to be printed in the information area of the reusable shipping container. Such an information area may be disposed at one or more convenient locations on the reusable shipping container. For example, an information area may be provided in proximity to a reusable shipping event code (e.g., immediately above or below the reusable shipping event code) so as to be readily accessible when the reusable shipping event code is scanned or otherwise accessed. Additionally or alternatively, such an information area may be provided in proximity to other attributes of the reusable shipping product (e.g., in an appropriate relative position with respect to a FIM) to facilitate use of the information area, use of the other reusable shipping product attributes, and/or cooperative use of each.

The information area of embodiments of a reusable shipping container comprises a build-up of removable information forms which are adapted to accept written or printed information. Accordingly, the shipper may remove a previously used information form to expose an unused information form in the build-up for accepting shipping information. Additionally or alternatively, the information area of embodiments of a reusable shipping container may comprise a serial information form to accept written or printed information. Thus, the shipper may obfuscate previously used information (e.g., by marking over the previous information) and use of another portion of the serial information form to accept the shipping information. The information area of embodiments may comprise a windowed pocket (e.g., a plastic or glassine window disposed in a surface of the reusable shipping container having a pocket or other area disposed beneath the window for holding an item, such as a slip of paper) into which items may be inserted and removed. Accordingly, the shipper may insert a slip of paper including information such as a delivery address, special handling instructions, shipping services desired, etc. for use when shipping services are provided. This item may be subsequently removed and replaced when the reusable shipping container is reused.

Shipping information in addition to the foregoing delivery address information may be provided at block 505 of embodiments. For example, a shipper may provide information regarding the particular delivery services desired (e.g., delivery schedule, special services, international delivery, etc.), sender information (e.g., return address information, shipping account, etc.), and/or the like.

It should be appreciated that the providing of information (e.g., reusable shipping event information and/or shipping information) is not limited to providing information from a shipper to a shipping event management system. For example, the shipping event management system may provide various information (e.g., shipping service options, acknowledgments, etc.) to the shipper via the user device. Moreover, a shipper may provide information to an intended recipient. For example, the shipper may utilize user device 124 to provide reusable shipping event code information to an intended recipient of the shipping item, perhaps after activation of the reusable shipping event code is completed, such as to enable the intended recipient to track the shipping item during shipping services processing, to change or revise shipping information (e.g., to revise the delivery address information), etc. Where utilization of the information by such an intended recipient results in increased fees for the shipping services (e.g., where the intended recipient changes special services to be provided), the intended recipient may provide payment for fees associated with such changes, such as using techniques for accounting for shipping service fees discussed below.

In operation according to embodiments of the invention, the user device (e.g., user device 124) may interact with a shipping event management system (e.g., shipping event management system 110) to obtain shipping service options available in association with the reusable shipping product (e.g., reusable shipping product 140) used with the shipping item (e.g., shipping item 160), as may be identified in a database (e.g., shipping event codes database 113) using the scanned reusable shipping event code (e.g., reusable shipping event code 141). For example, a choice of delivery schedule (e.g., a choice between one day delivery and two to three day delivery), selection of various special services (e.g., tracking services, delivery confirmation, expedited delivery, certified delivery, various classes of service, and various handling instructions, carrier pickup of the shipping item), etc. may be available when using the selected reusable shipping product. The shipper may select between such available options and/or input requested services etc., such as using the aforementioned user device and instruction set.

Additionally or alternatively, the user device may interact with a shipping event management system and/or other system (e.g., communication network system 121) to provide or obtain sender information useful for facilitating shipping services using a reusable shipping product herein. For example, shipper information may be determined from an identifier associated with the user device (e.g., telephone number, Internet protocol address, electronic serial number, etc.). Additionally or alternatively, shipper information may be solicited from a user. Such user information may comprise shipper identity (e.g., for known mailer requirements), shipper return address, shipper account information, and/or the like. For example, an account associated with the user device (e.g., cellular telephone services account, network services account, etc.) or an account accessible through the user device (e.g., online content store account, such as ITUNES account, online payment processing account, such as PAYPAL, etc.) may be accessed to obtain a sender address for use as return address information. Likewise, information regarding such an account may be utilized according to embodiments of the invention to provide for payment for the shipping services, whether for pre or post payment for provision of the shipping services, as discussed below.

At block 506 of the illustrated embodiment the shipping event code is activated for shipping the shipping item (e.g., shipping item 160 comprised of reusable shipping product 140 having reusable shipping container 141 and reusable shipping event code 142). For example, the shipper may be provided with information regarding the shipping services to be provided for the shipping item, such as the shipping fees, the delivery schedule selected, the class service, any special services and handling instructions, the delivery address, etc., for approval and activation of the reusable shipping event code. As can be appreciated from the foregoing, various of the information presented to the shipper for approval and activation may be obtained from and/or generated by systems other than the user device, such as shipping event management system 110, communication network system 121, etc.

Activation of the reusable shipping event code in accordance with embodiments of the invention performs a plurality of functions. For example, payment for the desired shipping services may be collected (e.g., from a shipping account input by the shipper or identified by the shipper information, from an account associated with the user device, using an electronic commerce token transmitted by the user device, etc.) or otherwise accounted for (e.g., an account from which payment for the shipping services is to be provided may be identified, funds in an account may be reserved for payment for shipping services, etc.). Additionally or alternatively, the reusable shipping event code may have a status identifier thereof updated to indicate the reusable shipping event code is "activated", as discussed below.

Directing attention to FIG. 6, operation corresponding to the foregoing operation of the flow diagram of FIG. 5, whereby a shipping event management system operates to facilitate shipping services using a reusable shipping product according to embodiments of the invention, is shown. In particular, the flow diagram of FIG. 6 shows operation by a shipping event management system (e.g., shipping event management system 110) in response to operation of a user device (e.g., user device 124) by a user for obtaining shipping services according to an embodiment of the invention.

At block 601 of the illustrated embodiment the shipping event management system receives reusable shipping event code information. For example, the digitized reusable shipping event code information obtained by user device 124 may be provided to shipping event management system 110, such as via communication network system 121 and/or network 101. Information in addition to the reusable shipping event code may be received by the shipping event management system of embodiments of the invention. For example, various shipping information (e.g., delivery address information, shipper information, desired shipping services information, etc.) relevant to providing shipping services using the reusable shipping product may be provided for use by the shipping event management system.

The reusable shipping event code is processed by the shipping event management system at block 602 of the illustrated embodiment. For example, shipping event management system 110 may operate to validate or verify that the reusable shipping event code is a reusable shipping event code for the particular shipping service provider, has not been removed from service, has not been flagged for fraudulent activity, and/or the like. Such verification may be accomplished, for example, by accessing shipping event codes database 113 using the received reusable shipping event code information.

Additionally or alternatively, processing of reusable shipping event codes in association with activation processing may operate to determine if the reusable shipping event code is currently active (e.g., indicating shipping services have not been provided or completed for a previous use/activation). Such embodiments may be utilized to avoid a paradox in shipping service provision when a reusable shipping event code is activated with different shipping information prior to completion of shipping services, to avoid a shipper paying more than once for shipping services associated with a use of the reusable shipping event code, etc. For example, where a shipper scans an already active reusable shipping event code, they may be provided with a message indicating that the reusable shipping event code is already activated, perhaps providing relevant shipping information (e.g., shipping service fees charged/to be charged, delivery address information, special services requested, etc.) where the shipper scanning the reusable shipping event code is the same shipper or otherwise associated with the shipper for which the reusable shipping event code is activated. Additionally or alternatively, where a shipper scans an already active reusable shipping event code and is the same shipper or otherwise associated with the shipper for which the reusable shipping event code is activated the shipper may be presented with the option of cancelling the shipping services, such as for a refund or partial refund of fees paid for the shipping services.

Processing of the reusable shipping event code information at block 602 of the illustrated embodiment may include determining information regarding the particular delivery services (e.g., delivery schedule, special services, international delivery, etc.) available in association with the reusable shipping event code. In operation according to embodiments of the invention, the shipping event management system (e.g., shipping event management system 110) may interact with a user device (e.g., user device 124) to provide shipping service options available in association with the reusable shipping product (e.g., reusable shipping product 140) used with the shipping item (e.g., shipping item 160). Such shipping options may, for example, be identified in a database (e.g., shipping event codes database 113) using the received reusable shipping event code. For example, a choice of delivery schedule (e.g., a choice between one day delivery and two to three day delivery), selection of various special services (e.g., tracking services, delivery confirmation, expedited delivery, certified delivery, various classes of service, and various handling instructions, carrier pickup of the shipping item), etc. may be provided to the shipper for selection. The options selected or otherwise input by the shipper may received by the shipping event management system (e.g., via communication network system 121 and/or network 101) for use in providing shipping services using the reusable shipping product of embodiments. Accordingly, various shipping information (e.g., the aforementioned delivery address information, shipper information, desired shipping services information, etc.) relevant to providing shipping services using the reusable shipping product may be received or otherwise obtained by the shipping event management system at block 602 of embodiments.

Processing operation at block 602 of embodiments of the invention includes processing of information in addition to the reusable shipping event code. For example, information received by the shipping event management system in addition to the reusable shipping event code may be processed according to embodiments of the invention. In operation according to an embodiment of the invention, delivery address information is cleansed to determine its accuracy, that it has not changed, etc. Updated/corrected delivery address information may be provided to the shipper, such as for confirmation and/or updating of the shipper's records (e.g., updating of the user device address book), and/or stored in association with the reusable shipping event code, such as within shipping event codes database 113.

At block 603 of the illustrated embodiment the fees for providing the desired shipping services using the reusable shipping product are accounted for. For example, the various shipping services options selected by the shipper and/or an appropriate flat fee for the selected reusable shipping product may be utilized to determine a fee for the shipping services. The shipping event management system may operate to access an account and obtain payment for the determined fees. For example, a shipping account (e.g., online postage metering account, prepaid shipping account, etc.) may be identified by shipper information provided in association with the reusable shipping event code and the fee amount debited therefrom. Alternatively, an account unrelated to shipping services (e.g., a cellular telephone services account, a computing services account, etc.), such as may be associated with the shipper and/or a user device utilized in activating the reusable shipping event code, may be used in accounting for the shipping services fees. It should be appreciated that payment for the shipping services may not be obtained at the time of accounting for the fees. For example, a post paid account may be debited (incremented) or otherwise identified to the satisfaction of the shipping service provider and/or an operator of the shipping event management system (e.g., a postage service provider such as Stamps.com, Inc.), whereby payment of the shipping service fee is paid at a later time (e.g., upon a billing cycle for the identified account, after provision of the shipping services, etc.).

The reusable shipping event code is activated for use in providing shipping services in association with the shipping item using the reusable shipping product at block 604 of the illustrated embodiment. For example, where the fees for the reusable shipping event code are satisfactorily accounted for a shipping event codes database (e.g., shipping event codes database 113) is updated to reflect activation of the reusable shipping event code. For example, a field of a record for the reusable shipping event code (e.g., in shipping event codes database 113) may updated to reflect an activated status. Additionally or alternatively, the reusable shipping event code may have been stored in an unactivated shipping event codes database (e.g., unactivated shipping event codes database 114) and thus be moved to an activated shipping event codes database (e.g., activated shipping event codes database 115) to reflect an activated status. Where the fees for the reusable shipping event code are not satisfactorily accounted for, processing according to embodiments of the invention may resort to exception processing instead of activating the reusable shipping event code. For example, the shipper may receive a message to provide different account information from which the fees may be debited.

Referring again to FIG. 5, having activated the reusable shipping event code for the shipping item, the shipping item is placed in the shipping stream for receiving shipping services at block 507 of the illustrated embodiment. For example, shipping item 160 having activated reusable shipping event code 142 associated therewith may be provided to the shipping services infrastructure, represented by shipping infrastructure 150, for providing the desired shipping services.

It should be appreciated that the shipping service provider may interact with the reusable shipping event code of embodiments in providing shipping services for a shipping item comprised of a reusable shipping product herein. For example, a carrier, processing facility, etc. of the shipping service provider may cause the reusable shipping event code to be scanned to confirm that the reusable shipping event code has been activated, that payment for the shipping services has been accounted for, to determine delivery address information, to determine shipping services to be provided, to determine special shipping services, to determine handling requirements, etc. In operation according to embodiments of the invention, the shipping service provider may use scanner 133 (e.g., an imaging apparatus, a barcode scanner, a RF identification scanner, etc.) to scan reusable shipping event code 142 and access associated information. For example, scanner 133 may be in communication with server platform 131 of shipping services system 130 and provide reusable shipping event code information thereto. Server platform 131 of embodiments is in communication with shipping event management system 110, such as via network 101, and thus may access shipping information stored in association with the reusable shipping event code by shipping event codes database 113. Additionally or alternatively, information useful for providing shipping services using reusable shipping products herein may be stored by systems of shipping services system 130, such as within database 132 of server platform 131. For example, data of shipping event codes database 113 may be provided to database 132 for use by a shipping service provider in providing shipping services.

It should be appreciated that information available using the reusable shipping event code may be utilized by the shipping service provider in providing shipping services. For example, the reusable shipping event code may be utilized in place of postage indicia or other proof of payment for determining if payment for the shipping services has been properly accounted for. Additionally or alternatively, the reusable shipping event code may be utilized for determining a delivery address for the shipping item. Moreover, the reusable shipping event code may be utilized for determining the shipping services to be provided, any special services to be provided, any special instructions regarding the handling of the shipping item, etc. For example, a shipping service provider carrier and/or other employee (e.g., at a point of pick-up of a shipping item, at a point of delivery of a shipping item, during handling of the shipping item for providing shipping services, etc.) may utilize the reusable shipping event code (e.g., using a user device, such as a cellular phone or other device having an imaging apparatus, to scan the reusable shipping event code and access data of a reusable shipping event codes database) to determine if payment has been made for the shipping services, to determine a delivery address, to determine services to be provided with respect to the shipping item, etc.

Shipping information stored in association with a reusable shipping event code of embodiments of the invention may be enabled to be updated or otherwise revised by a shipper or other user (e.g., intended recipient). For example, a shipper or intended recipient may change or update the delivery address information during shipment of the shipping item by interacting with shipping event code management system 110 and/or shipping services system 130 using the reusable shipping event code (e.g., as may be stored by user device 124 or otherwise accessible to the shipper or intended recipient). Similarly, a shipper or intended recipient may change, add, or otherwise alter other shipping information associated with the reusable shipping event code (e.g., shipping services, special services, handling instructions, etc.). Where such alterations result in increased fees for the shipping services, the shipper or intended recipient may provide payment for fees associated with such changes, such as using the above techniques for accounting for shipping service fees.

Once shipping services have been completed with respect to a particular shipping item, and thus the reusable shipping product used thereby, embodiments of the invention operate to enable the reusable shipping event code thereof for reuse. For example, upon final delivery scan of the shipping item, the reusable shipping event code may be indicated as unactivated (e.g., moved to unactivated shipping event codes database 114 from activated shipping event codes database 115) to facilitate reuse of the reusable shipping product. Some or all of the shipping information previously associated with the reusable shipping event code may be deleted or otherwise prepared for reuse of the reusable shipping product. In operation according to embodiments of the invention, at least a portion of the previously used shipping information is retained, such as in one or more previous shipping information record, for later use (e.g., logging functions, "return to sender" functions, etc.).

It should be appreciated that although embodiments have been described herein with reference to the use of flat rate shipping fees, such as to avoid the need to weigh objects being shipped, the concepts of the invention are not limited to the use of any particular fee structure. Moreover, embodiments of the invention are not limited to the use of the same fee structure (e.g., flat fee structure) for each use/reuse of a reusable shipping product herein. Mass shippers, such as online retailers (e.g., Amazon.com, Bestbuy.com, Walmart.com, etc.), may wish to participate in the distribution of reusable shipping products, such as to have their logos or business slogans receive wide visibility in association with the reuse of the reusable shipping products. Accordingly, such mass shippers may ship their products to recipients using reusable shipping containers of reusable shipping products herein. However, such mass shippers may prefer to take advantage of the often lower shipping rates associated with low weight objects and thus prefer to pay weight based shipping fees rather than flat fee shipping rates. A shipping service provider may thus allow one or more use of a reusable shipping product to have shipping fees based upon a first rating technique (e.g., weight based) while other uses of the reusable shipping product are based on a second rating technique (e.g., flat fee based). The particular rating technique used may be controlled by the particular use/reuse of the reusable shipping product (e.g., the initial use of the reusable shipping product or subsequent use thereof), the particular shipper making the shipment (e.g., mass shipper or casual shipper), etc.

Embodiments of the invention may operate to provide robust services with respect to the reusable shipping products herein. For example, in addition to operation allowing a shipper the option of cancelling the shipping services for a reusable shipping event code that is rescanned by the shipper prior to placing the shipping item in the shipping stream (as described above), nonuse of an activated reusable shipping event code may result in cancellation of the shipping services. Embodiments of the invention use shipping information (e.g., shipper information, account information, etc.) stored in association with a reusable shipping event code to cancel shipping services and provide a refund or partial refund of fees for the shipping services when the reusable shipping product is not introduced into the shipping stream within an amount of time (e.g., day, week, month, etc.). As another example of robust services provided with respect to the reusable shipping products herein, activation of a reusable shipping event code may initiate a request for a carrier of the shipping service provider to pick up the shipping item, such as using the shipping information for an address at which the shipping item is to be retrieved.

Additionally or alternatively, various milestones in the shipping services processing of the shipping item may result in messages or other information being provided to the shipper. For example, upon final delivery scan a message may be sent by the shipping services system to the user device.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for facilitating shipping using a reusable shipping container, the system comprising:
   a database configured to store records corresponding to one or more reusable shipping services labels, wherein each of the one or more reusable shipping services labels corresponds to a particular reusable shipping container and includes information that is configured to identify available special services consistent with one or more attributes of the corresponding particular reusable shipping container, wherein the records associated with the one or more reusable shipping services labels comprise current shipping information records and previous shipping information records, wherein a particular current shipping information record corresponding to a particular reusable shipping service label comprises information that is configured to identify one or more activated special services for a particular shipment using the particular reusable shipping container corresponding to the particular reusable shipping service label and information that is configured to identify one or more unactivated special services for the particular shipment using the particular reusable shipping container, and wherein the previous shipping information records comprise information associated with previous shipments using reusable shipping containers corresponding to each of the one or more reusable shipping services labels;
   at least one processor communicatively coupled to the database, the at least one processor configured to:
      receive, from a user device, information identifying a reusable shipping services label corresponding to a reusable shipping container;
      determine available special services consistent with one or more attributes of the reusable shipping container based on the information identifying the reusable shipping services label;
      initiate transmission of the available special services to the user device;
      subsequent to transmission of the available special services to the user device, receive first shipping information associated with a first shipment using the reusable shipping container having the reusable shipping services label permanently affixed thereto, wherein the shipping information comprises information included in the reusable shipping services label corresponding to the reusable shipping container, delivery address information, and information that indicates select special services of the available services to be provided during the first shipment using the reusable shipping container;

update, at the database, a current shipping information record corresponding to the reusable shipping services label to activate the reusable shipping services label with respect to the select special services and to unactivate non-select special services associated with the reusable shipping services label;

receive, from a second user device, information identifying the reusable shipping services label corresponding to the reusable shipping container;

determine the available special services consistent with one or more attributes of the reusable shipping container identified by the reusable shipping services label;

initiate transmission of the available special services to the user device;

subsequent to transmission of the available special services to the second user device, receive, from the second user device, second shipping information associated with a second shipment using the reusable shipping container, wherein the second shipping information comprises second information identifying the reusable shipping services label corresponding to the reusable shipping container, second delivery address information, and information that indicates second select special services of the available services to be provided during the second shipment using the reusable shipping container;

generate, at the database, a previous shipping information record corresponding to the reusable shipping services label, wherein the previous shipping information record includes at least a portion of the first shipping information; and update, at the database, the current shipping information record corresponding to the reusable shipping services label to activate the reusable shipping services label with respect to the second select special services and to unactivate second non-select special services associated with the reusable shipping services label; and a memory communicatively coupled to the at least one processor.

2. The system of claim 1, wherein the at least one processor is configured to charge a fee for the first shipment using the reusable shipping container based on a weight of the reusable shipping container, and to charge fees for subsequent shipments using the reusable shipping container based on a flat fee.

* * * * *